United States Patent [19]

Gilead

[11] 4,053,109

[45] Oct. 11, 1977

[54] WATER CONDUCTING AND EMITTING DEVICE

[76] Inventor: Gideon Gilead, 5 Nicaragua Street, Jerusalem, Israel

[21] Appl. No.: 655,487

[22] Filed: Feb. 5, 1976

[30] Foreign Application Priority Data

Feb. 25, 1975 Israel .................................. 46706

[51] Int. Cl.$^2$ .................................. B05B 15/00
[52] U.S. Cl. .................................. 239/542; 138/42
[58] Field of Search .................. 239/542, 547, 450; 138/42

[56] References Cited

U.S. PATENT DOCUMENTS

| | | | |
|---|---|---|---|
| 3,080,124 | 3/1963 | Rathmann | 239/542 X |
| 3,662,955 | 5/1972 | Takanashi | 239/450 X |
| 3,870,236 | 3/1975 | Barragan | 239/542 |
| 3,874,598 | 4/1975 | Havens | 239/542 |
| 3,887,138 | 6/1975 | Gilead | 239/542 |

*Primary Examiner*—Evon C. Blunk
*Assistant Examiner*—Michael Mar
*Attorney, Agent, or Firm*—Weingarten, Maxham & Schurgin

[57] ABSTRACT

The present invention relates to an improvement of the irrigation device described in my earlier U.S. Pat. No. 3,887,138.

There I have described an elongated continuous hollow hose for conveying fluid through the interior thereof and formed with a helical fluid flow passage of predetermined pitch between the inner and outer surfaces thereof, the helical passage having an axis substantially coaxial with the longitudinal axis of said hose.

According to the present improvement the grooving need not be helical, it may be a continuous groove of regular or irregular convolutions, meandering along the extension of the respective hose.

11 Claims, 11 Drawing Figures

WATER CONDUCTING AND EMITTING DEVICE

BACKGROUND OF INVENTION

The present invention concerns improvements in the device according to the above mentioned U.S. Pat. No. 3,887,138.

As has been mentioned in my said Patent, the two elements, one extending within the other, are manufactured by an extrusion process and are fused together by heat treatment. Thus a continuous conduit is obtained which serves a twofold purpose — it is the feed conduit conducting a flow of water, and at the same time serves as the means for emitting a trickle or drip-emission of irrigation water.

In practice the grooving of the hose conduit is performed by two oppositely disposed jaws which are positioned at the exit of the extruded hose from the extrusion tool, and which press from both sides against the still mouldable mass of the emerging hose, imparting to it the desired grooving.

SUMMARY OF THE INVENTION

There is provided a device for use as a supply conduit of irrigation water combined with a trickle or drip emitter, consisting of two continuous hose like elements extending within one another, a conduit for water being formed between the outer wall of the inner and the inner wall of the outer hose like element, openings being provided in the wall of the inner element establishing communication between the interior of the inner hose like element and the said conduit, and further, there being provided apertures in the wall of the outer hose like element leading from said conduit into the open, characterised thereby that the said conduit is constituted by a continuous groove obtained by undulations pressed into the wall of one of the hose like element.

According to another improved feature, the groove need not extend along the whole extension of the two hose elements, there may be created groove sections alternating with ungrooved ones, each grooved section constituting a distinct section emitting a trickle. Such a construction may be obtained by employing grooved jaws which alternate with jaws pressing against the outermost hose element and causing it to tightly adhere to the inner element. At the same time heat is made to act on the said inwardly pressed stretch of hose, possibly by means of the pressing jaws themselves. In that way the inwardly pressed sections effectively seal off one stretch of created groove against the one before it and against the subsequent stretch of groove.

Yet another improved feature of the device described in my said Patent now consists therein that the outer hose element is of slightly larger diameter than that of the inner one - the difference being in the range of 2-6 millimeters; the outer hose is spirally grooved and the inwardly extending ridges of the helix contact or are immediately fused to the inner ungrooved hose. In that way a helical path of very small cross sectional area is formed. In that way I obtain a conduit which is sometimes referred to as a "microtube" which is integral with the inner hose element serving as a main feed line. Until now such a device has been produced by winding a flexible tube of very small inner diameter about a wide tube or hose and providing apertures in the wide tube and registering holes in the narrow one, so as to establish communication between the two conduits.

Alternatively, both the outer and inner hose may be grooved, but the grooving of the outer one being more pronounced, i.e. being deeper than the shallower grooving of the inner hose. Again, a helical path of very small diameter is formed between the two hoses.

Yet another feature of the present invention is the manner in which communication between the interior of the inner tube and the helical path may be obtained. In my main Patent and in accordance with the foregoing variations, this communication is established by punching or otherwise providing a hole in the wall of the innermost tube. When punching or cutting a hole this is done by removal of part of the wall in which the hole is provided. To be sure, this part may be a minute fragment of material, but nevertheless it must not be overlooked that such small fragments are severed from the hose wall. This has two disadvantages: one disadvantage resides therein that it becomes necessary to remove the cut out portions of fragments from the interior of the hoses. This means a separate operation and is not easy to achieve for certain technological reasons. Moreover, small as the hole may be, it constitutes a certain area which might become clogged by sand or other foreign bodies carried by the water. This would mean that a portion of the helical path is not fed with water and becomes inoperative. In order to do away with these disadvantages I have found that it is advantageous to cut a slit or slits into the wall of the inner hose, without the removal of material therefrom. Such a slit, under the interior pressure of the water in the innermost hose is spread open and permits a certain quantity of water to pass through. Such a cut slit will not as easily be clogged or stopped by foreign bodies carried by the water. Of course, it is also possible to make like slits in the outer hose for the emission of the trickle, so that when there is no flow, the outlet would be closed thus preventing insects from depositing eggs in the said outlet parts, as it has been experienced and also preventing accidental clogging by dirt. The slits may be arranged singly or in pairs, they may be in parallel or crossing one another.

SHORT DESCRIPTION OF DRAWINGS

So that the invention might be better understood it will now be described with reference to the annexed drawings, which illustrate in a schematical manner hoses according to the invention.

FIGS. 5a-e show different configurations of slit openings through the wall of the tube.

DESCRIPTION OF PREFERRED EMBODIMENTS

Figure 1:
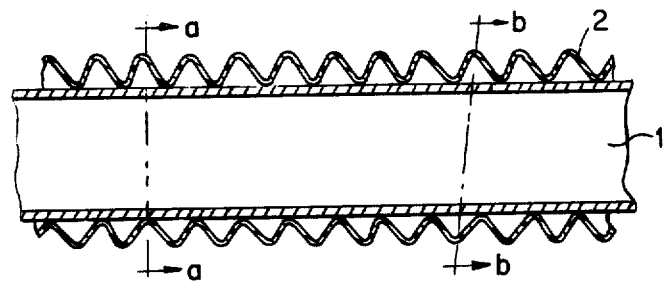
FIG. 1 is a longitudinal, axial section of hoses according to the invention and as described in the above mentioned main patent.
Figure 1A:
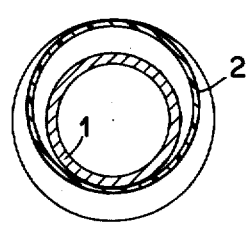
FIG. 1a is a section on line aa.
Figure 1B:
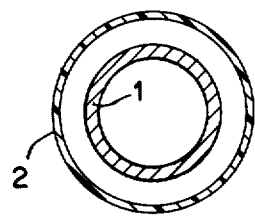
FIG. 1b is a section on line bb.

The hose (half is shown only in FIG. 1) comprises the inner hose 1 and the outer, helically grooved one, 2. It can be seen in FIG. 1 that there comes into existence an helical path indicated in FIGS. 1a and 1b. This is the state of art as it becomes clear from the main patent.

Figure 4:
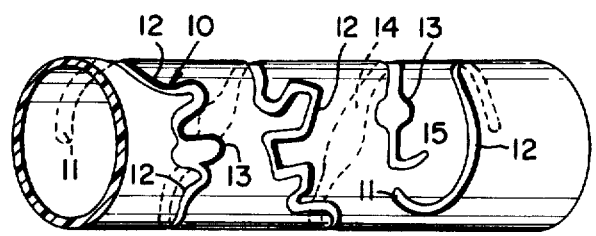
FIG. 4 shows examples of the shapes that may be assumed by the conduit.

Instead of making the outer hose with a helical groove and thus achieving a helical conduit around the innermost one, it is possible to provide tools which press into the outer hose when it emerges from the extrusion machine, (as will become clear later on), a continuous groove indicated by the numeral 5 which may ascribe a labyrinth and turn to and fro and backward as might be chosen. Practically, there is no limit to the configuration and shape of the path and it will be a matter of trial to find the most advantageous configuration. Examples of the shapes that may be assumed by the conduit or groove are shown in FIG. 4. A passage 10 of varying cross-sectional area is generally helical but each turn follows a sinuous or labyrinth path. One end of the passage is indicated by reference numeral 11. The passage is of uniform cross-sectional area over the regions 12. At 13, the passage suddenly adapts a wider cross-sectional area. Reference numeral 14 indicates a portion of the passage hidden from view which gradually increases and then gradually decreases in cross-sectional area. The other end of the passage is indicated by reference numeral 15.

Figure 2:
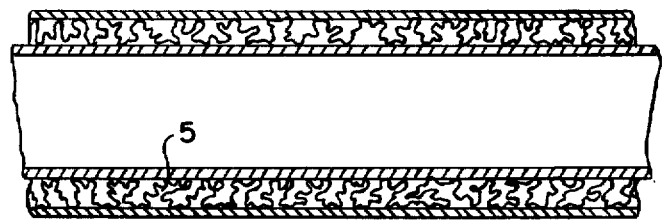
FIG. 2 shows in a schematical way the arrangement of a hose unit according to the invention wherein, however, the path is not a helical one but is a meandering path of some haphazard continuation.
Figure 3:
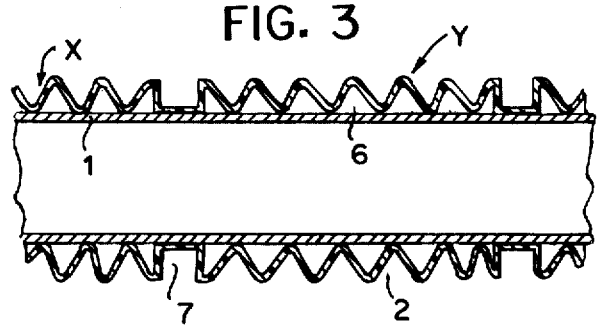
FIG. 3 illustrates the case where the narrow path around the innermost hose is interrupted sectionwise, in other words, there are created portions which are distinct from one another and sealed off against one another.

According to FIG. 3, the outermost hose is provided with helically extending groove 6 for limited portion thereof only. Between the portion indicated by x and the one indicated by y, there extends a ring shaped groove 7 which is not continuous lengthwise but forms a collar around the innermost hose and thus effectively seals off the continuous conduit formed in portion x from the continuous conduit formed in y. Of course such a collar need not extend all round the hoses but need only be sufficient to close off the conduit or groove 5 or 6 of FIGS. 2 and 3 respectively. While generally the cross section of the path from which the trickle is emitted will be uniform, it would be within the scope of the invention to make this conduit alternatingly wider and narrower, increasing turbulence. In this manner a unit can be delivered to the consumer of which he may cut pieces as required, each of the pieces forming a trickle emitter.

Figures 5A, 5B, 5C:
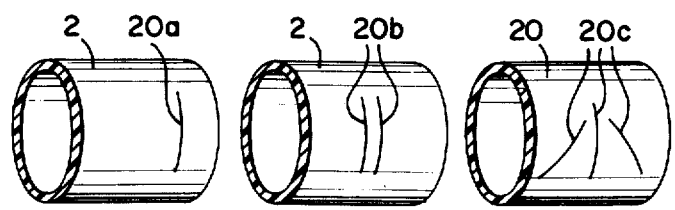
Figures 5D, 5E:
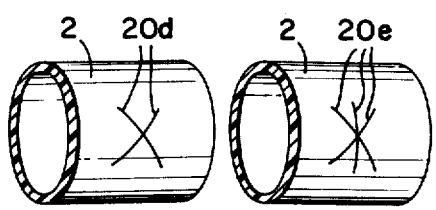

The provision of slit openings through the wall of the outer tubular element is illustrated in FIG. 5. FIG. 5a illustrates a single slit 20a in a radial plane; FIG. 5b shows a pair of parallel slits 20b in two parallel radial planes; FIG. 5c illustrates three slits 20c in three mutually inclined planes; FIG. 5d has two slits 20d that intersect one another; and FIG. 5e shows three slits 20e intersecting one another. Other suitable configurations of one or more slits will be readily apparent.

What is claimed is:

1. An irrigation device comprising:
    an inner elongated continuous hollow hose element for conveying fluid through the interior thereof;
    an outer elongated continuous hose element coaxial with and external of said inner hose element; and
    a fluid conduit formed in the space between the outer surface of said inner hose element and the inner surface of said outer hose element, said conduit having a non-helical pattern in said irrigation device and extending in a generally longitudinal fashion, said conduit being formed by pressing undulations into the wall of one of said inner and outer hose elements thereby placing said hose walls in contact at various locations depending upon the pattern of said undulations;
    said inner hose element wall having a plurality of openings therethrough spaced along the length of said irrigation device to provide fluid communication between the interior thereof and said conduit;
    said outer hose element wall having a plurality of openings therethrough spaced along the length of said irrigation device to provide fluid communication from said conduit to the exterior of said irrigation device;
    whereby fluid flow through said conduit is non-laminar and trickles or drips from said openings along the length of said outer hose element.

2. The irrigation device recited in claim 1 wherein said irregular conduit has a repetitive pattern.

3. The irrigation device recited in claim 1 wherein said irregular conduit is formed in a meandering, haphazard pattern.

4. The irrigation device recited in claim 1 wherein said irregular conduit is sealed off at intervals along the length of said irrigation device, each segment thereby partitioned being fluid tight in relation to one another and each said segment including at least one of said openings in said inner hose element and at least one of said openings in said outer hose element.

5. The device claimed in claim 4, characterised thereby that between given portions of the device a length of the outer hose like element is pressed tightly onto the inner hose like element, the said stretch constituting a flow seal between consecutive portions.

6. The irrigation device recited in claim 1 wherein said openings in said inner hose element wall are slits cut into said wall.

7. The irrigation device recited in claim 1 wherein said openings in said outer hose element wall are slits cut into said wall.

8. The irrigation device recited in claim 1 wherein each of said openings in said inner hose element is separated from each of said openings in said outer hose element by a portion of length of said conduit.

9. An irrigation device comprising:
    an inner elongated continuous hollow hose element for conveying fluid through the interior thereof;
    an outer elongated continuous hose element coaxial with and external of said inner hose element; and
    a fluid conduit formed in the space between the outer surface of said inner hose element and the inner surface of said outer hose element, said conduit extending in said irrigation device in a generally longitudinal fashion, said conduit being formed by pressing undulations into the wall of one of said inner and outer hose elements thereby placing said hose walls in contact at various locations depending upon the pattern of said undulations;
    said inner hose element wall having a plurality of openings therethrough spaced along the length of said irrigation device to provide fluid communication between the interior thereof and said conduit;
    said outer hose element wall having a plurality of openings therethrough spaced along the length of said irrigation device to provide fluid communication from said conduit to the exterior of said irrigation device, each said opening in said inner hose element being spaced longitudinally from each said opening in said outer hose element, whereby fluid entering said conduit through said opening in said inner hose element must travel through a relatively long length of said conduit to reach one of said openings in said outer hose element;

said conduit being sealed off at intervals along the length of said irrigation device by pressing said outer hose element against the wall of said inner hose element, each segment thereby partitioned being fluid tight in relation to one another and each said segment including at least one of said openings in said inner hose element and at least one of said openings in said outer hose element whereby fluid trickles or drips from the openings in each segment of said outer hose element along the length of said irrigation device.

10. The irrigation device recited in claim 9 wherein said conduit extends generally longitudinally in a helix around said irrigation device within each said segment.

11. The irrigation device recited in claim 9 wherein said conduit extends generally longitudinally in a non-helical pattern in said irrigation device within each said segment.

* * * * *